United States Patent [19]

Ruf et al.

[11] Patent Number: 4,699,092
[45] Date of Patent: Oct. 13, 1987

[54] FLUID-COOLED CYLINDER HEAD

[75] Inventors: Max Ruf, Obereisesheim; Erwin Korostenski, Oedheim, both of Fed. Rep. of Germany

[73] Assignee: Audi AG, Ingolstadt, Fed. Rep. of Germany

[21] Appl. No.: 851,559

[22] Filed: Apr. 14, 1986

[30] Foreign Application Priority Data

May 8, 1985 [DE] Fed. Rep. of Germany ....... 3516453

[51] Int. Cl.$^4$ ................................................. F01P 3/02
[52] U.S. Cl. ........................ 123/41.82 R; 123/193 H
[58] Field of Search .................... 123/47.74, 41.82 R, 123/193 H

[56] References Cited

U.S. PATENT DOCUMENTS 4,121,550 10/1978 Wand et al. .................. 123/41.82 R
4,377,990 3/1983 Seidl ............................ 123/41.82 R

FOREIGN PATENT DOCUMENTS

562883 9/1958 Canada ......................... 123/41.82 R

Primary Examiner—William A. Cuchlinski, Jr.
Attorney, Agent, or Firm—Kane, Dalsimer, Kane, Sullivan and Kurucz

[57] ABSTRACT

In a fluid-cooled cylinder head for a series of cylinders of a multi-cylinder internal combustion engine provided with a combustion chamber for each cylinder, the cooling water chambers co-ordinated with the individual combustion chambers are separated from each other, so that individual small casting cores can be used instead of a large casting core forming all the cooling water chambers of the cylinder head. The appropriate number of small casting cores can be inserted into the mould according to the number of cylinders, so that cylinder heads for cylinder blocks with different numbers of cylinders can be manufactured, using several casting cores. The cooling water chamber for each combustion chamber is so designed that a single unipart casting core can be used, which is so shaped that the cooling water is directed against the wall of the combustion chamber and against the sparking plug dome.

7 Claims, 10 Drawing Figures

FLUID-COOLED CYLINDER HEAD

This invention relates to a fluid-cooled cylinder head for a multi-cylinder internal combustion engine of the type in which the cylinder head has a combustion chamber for each cylinder, valve-controlled inlet and outlet ducts opening into each chamber, a bore for a spark plug or injection valve also opening into the chamber and located in a dome or ridge, cooling fluid chambers defined by the walls of the combustion chambers and through which the inlet and outlet ducts and also the dome extend, inlet orifices in the floor of the cylinder head, communicating with said cooling chamber and also with cooling chambers in the cylinder block, and outflow ducts leading therefrom.

In one known cylinder head of this type, the cooling fluid chambers are co-ordinated with the individual combustion chambers, communicate with each other, and in each case they are also divided into an upper and a lower chamber by a dividing wall running parallel with the floor of the cylinder head. This known construction of cooling fluid chambers requires complicated casting cores not only for the upper but also for the lower cooling chambers, which extend over the entire length of the series of cylinders and are both expensive to manufacture, and introduce danger of fracture.

The problem underlying the invention is to produce a fluid-cooled cylinder head of the type mentioned, which is especially distinguished by being easier to manufacture.

The invention consists in a fluid-cooled cylinder head of the type referred to, the cooling fluid chambers for the individual combustion chambers being separated from each other, and each cooling fluid chamber being in the form of a single annular chamber which surrounds the respective dome, and through which the inlet and outlet gas ducts and the valve guides for the outlet valve or valves pass, the circumferential wall of the annular chamber having ribs which extend in the direction of the dome, and the drainage duct of each annular chamber opening into a drainage collector duct which extends along the cylinder head.

In the preferred method of performing the invention, the cooling fluid chambers for the individual combustion chambers are in each case manufactured by means of a single unipart casting core, which is correspondingly small and therefore not extremely sensitive to fracture. In order to manufacture the cylinder head, a number of casting cores of this type corresponding to the number of cylinders, are inserted into the mould, so that cylinder heads for engines having different numbers of cylinders can be manufactured using several identical casting cores. Because the individual casting cores have relatively small dimensions compared with a single casting core for all the cooling fluid chambers of one cylinder head, the mounting of the casting in the mould is considerably simplified. In spite of the unipart construction of the cooling fluid chamber, effective cooling of the wall of the combustion chamber and of the dome accepting the spark plug or injection valve is achieved by ribs, which extend from the circumferential wall of the annular chamber in the direction of the dome. Uniform cooling of all the combustion chambers of the cylinder head is also ensured by the intentional individual cooling of each combustion chamber wall.

The drainage duct preferably emanates from a point of the annular chamber which lies at or adjacent the highest point of the annular chamber, and/or lies closer to the dome accepting the spark plug or the injection valve than the inlet orifices. These inlet orifices are preferably arranged not only on the side of the inlet duct(s) but also on the side of the outlet duct(s). The cooling fluid is thus caused to flow upwards on all sides of the dome, without need for a dividing wall as in the case of prior constructions.

In another form of cylinder head according to the invention, with at least two inlet ducts and at least two outlet ducts, the inlet orifices can also merely be arranged on the side of the outlet ducts, in which case orifices for cooling fluid are preferably provided between adjacent inlet ducts and between adjacent outlet ducts, adjacent to the annular chamber, and the drainage duct emanates from a point on the annular chamber which lies on the side of the inlet ducts. In this case the flow through the annular chamber is transversely from the side of the outlet ducts to the side of the inlet ducts, the dome which receives the spark plug or the injection valve having intensive fluid flow round it without need for a dividing wall as in the prior art. Alternatively, the inflow orifices can be arranged on the side of the inlet ducts, and the drainage duct can emanate from a point which lies on the side of the outlet ducts. The previously described arrangement is, however, preferred.

The invention may be performed in various different ways and two specific embodiments with some possible modifications will now be described by way of example with reference to the accompanying drawings, in which.

Figure 1:
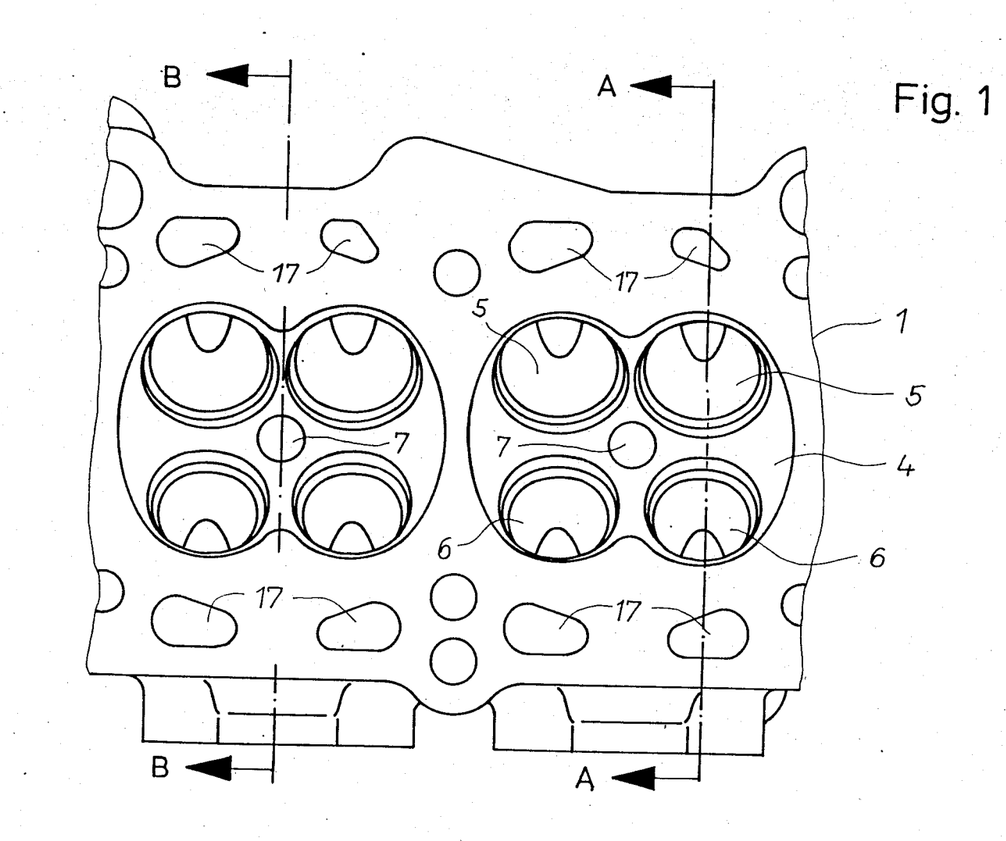
FIG. 1 is a partial view of the floor of a cylinder head according to the invention for a 6-cylinder internal combustion engine.
Figure 2:
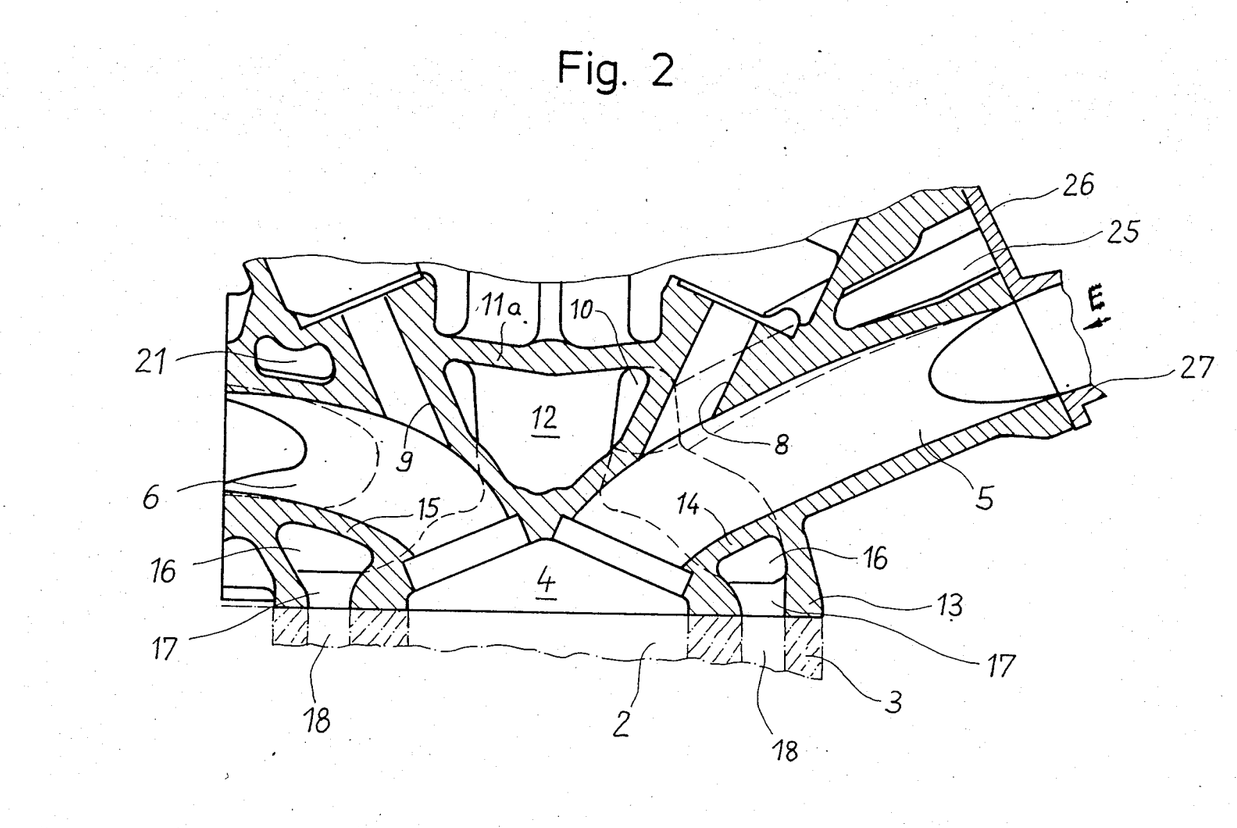
FIG. 2 is a cross-section on the line A—A in FIG. 1.
Figure 3:
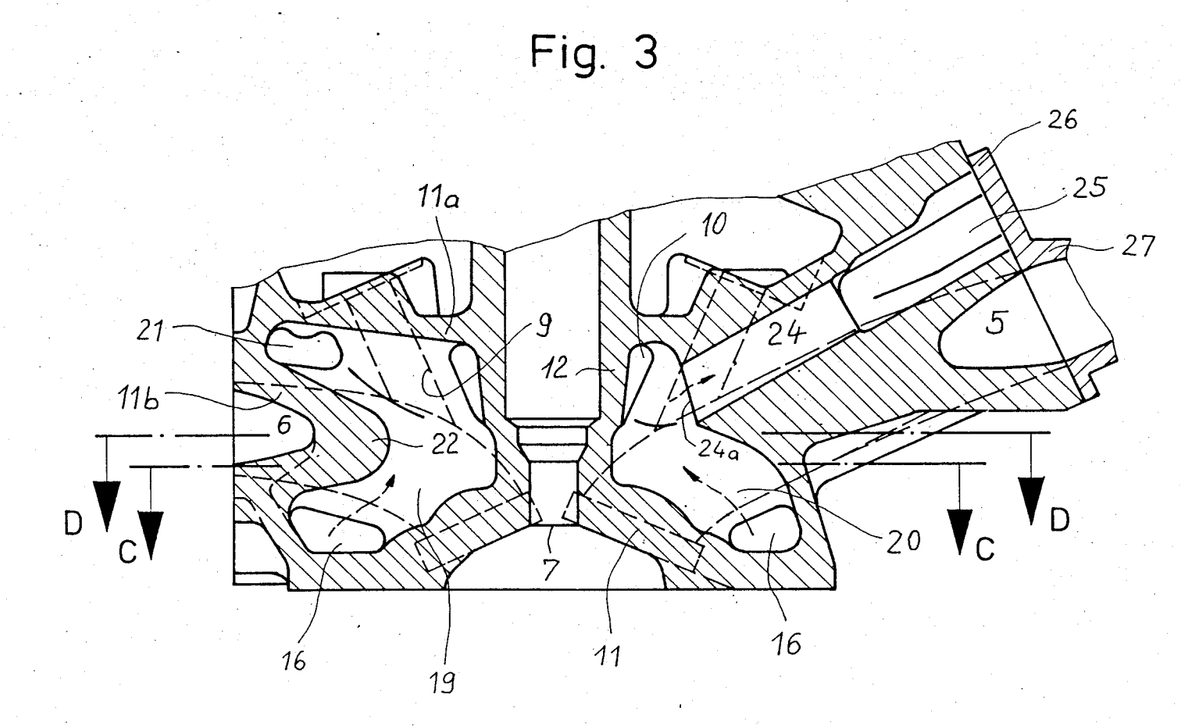
FIG. 3 is a cross-section on the line B—B in FIG. 1.
Figure 4:
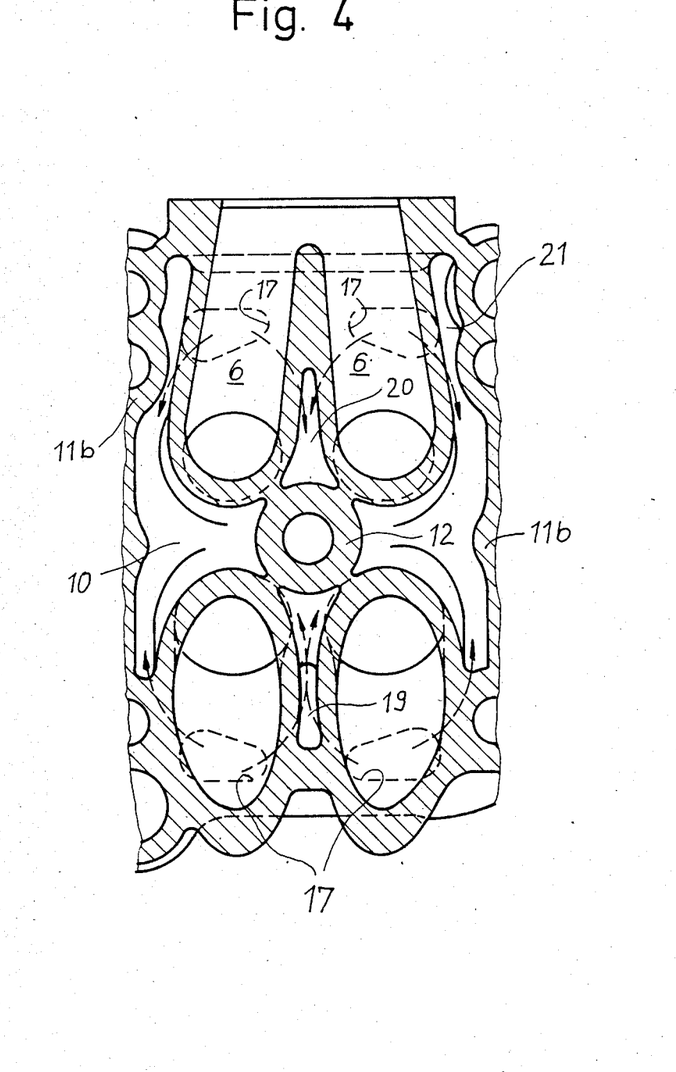
FIG. 4 is a cross-section on the line C—C in FIG. 3.
Figure 5:
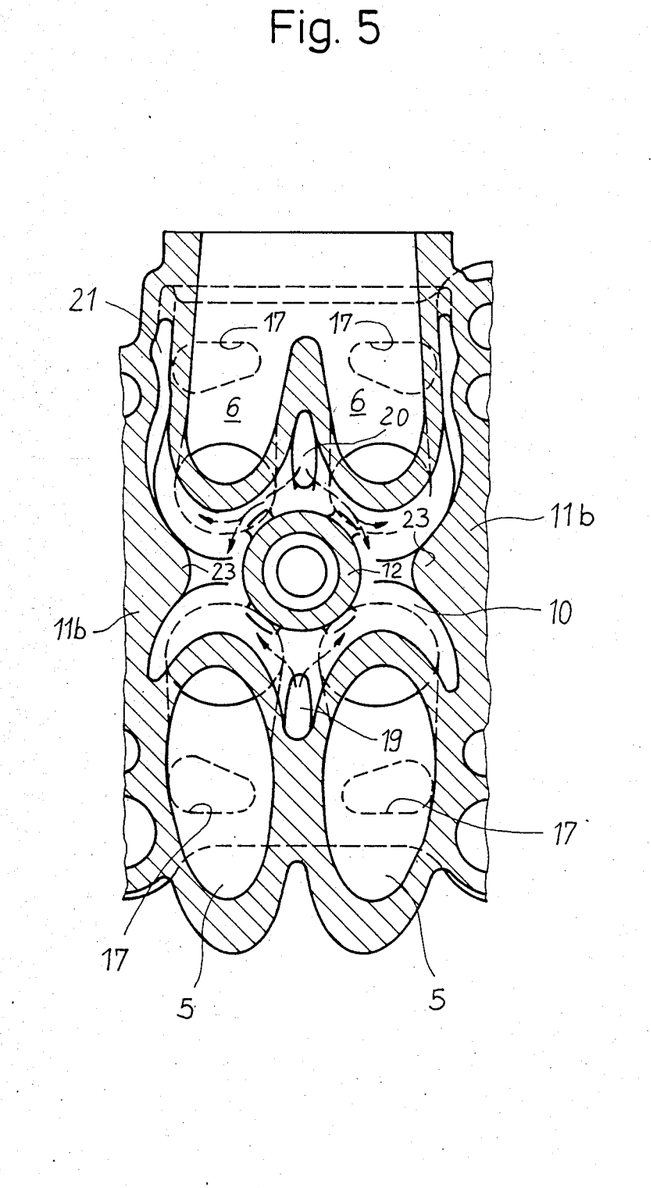
FIG. 5 is a cross-section on the line D—D in FIG. 3.
Figure 6:
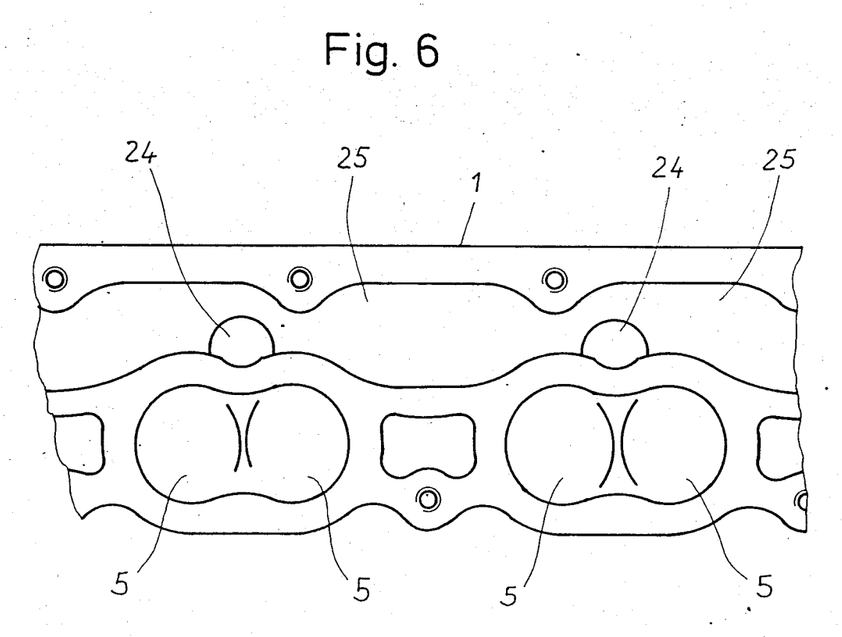
FIG. 6 is a view of the flange surface of the cylinder head in the direction of the arrow E in FIG. 2.
Figure 7:
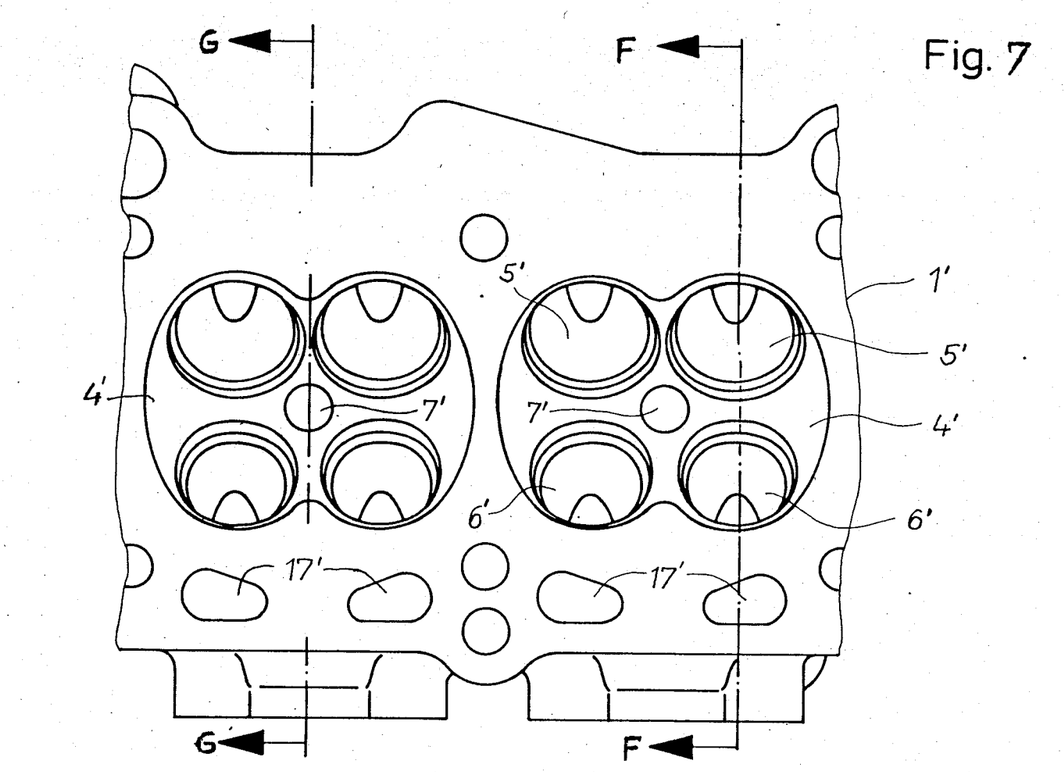
FIG. 7 is a partial view corresponding to FIG. 1 of a second example of cylinder head according to the invention.
Figure 8:
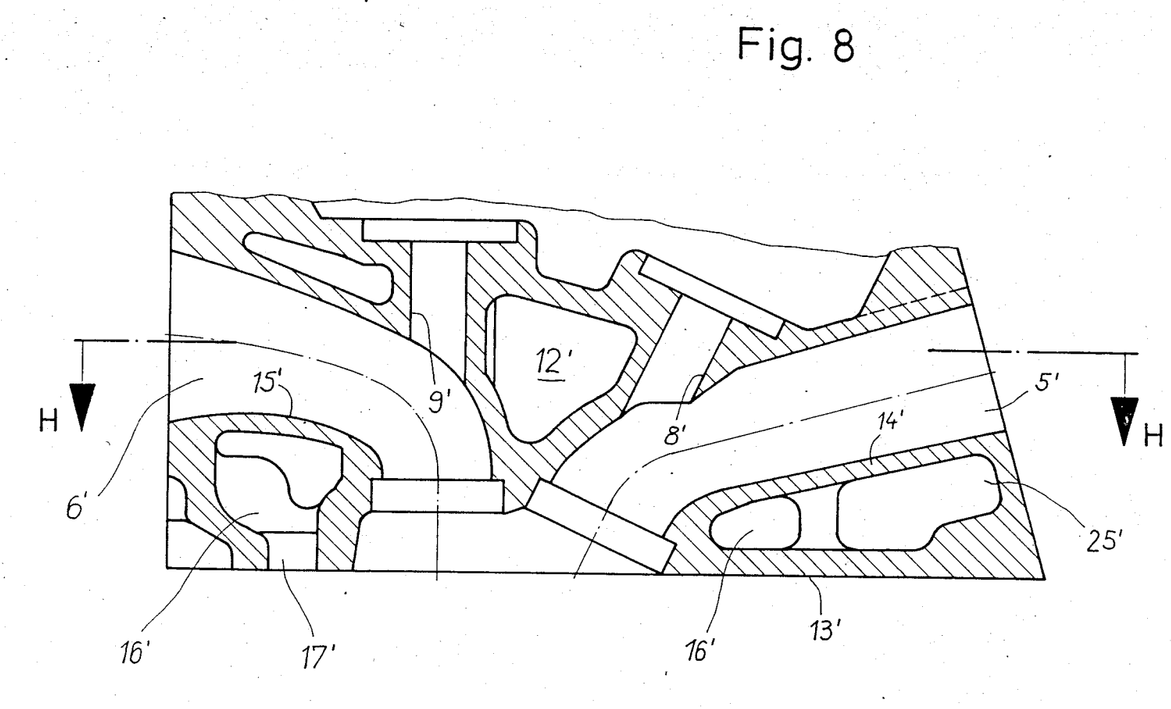
FIG. 8 is a cross-section on the line F—F in FIG. 7.
Figure 9:
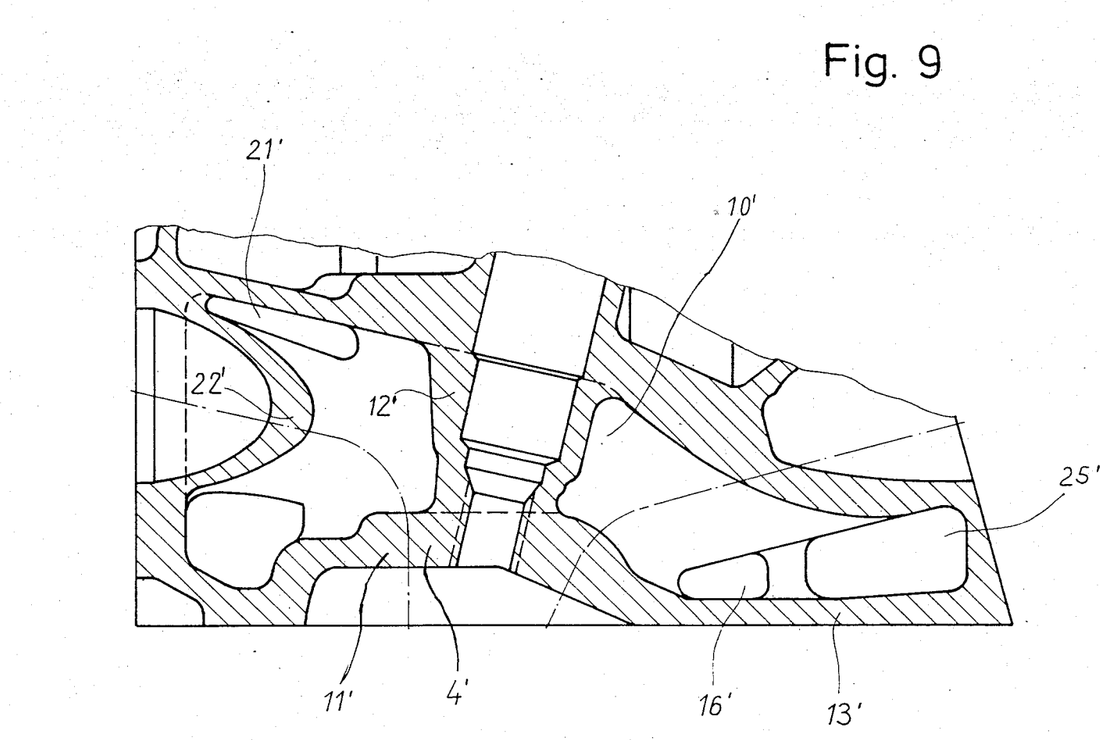
FIG. 9 is a cross-section on the line G—G in FIG. 7.
Figure 10:
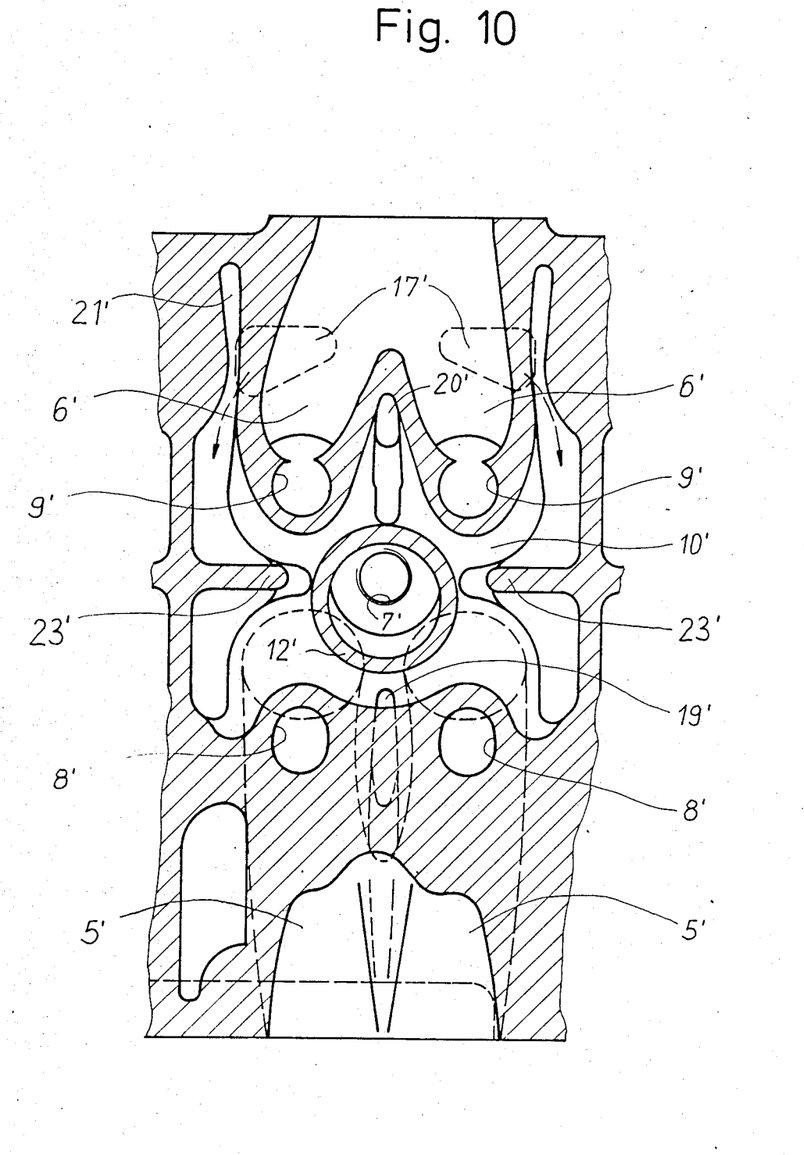
FIG. 10 is a cross-section on the line H—H in FIG. 8.

Referring first to the example of FIGS. 1 to 6, the cylinder head 1 has a combustion chamber 4 for each cylinder 2 of the cylinder block 3 indicated in dot-dash fashion in its floor 13 facing the latter. Into each combustion chamber in this example two inlet ducts 5 and two outlet ducts 6 open, and also a bore 7 for receiving a spark plug. The inlet and outlet ducts 5 and 6 are controlled by valves (not illustrated) extending through valve guides 8 and 9. The cylinder head 1 is fluid-cooled, there being coordinated with each combustion chamber 4 an individual annular cooling fluid chamber 10, which is separated from the cooling fluid chamber(s) for the adjacent combustion chamber(s). Each cooling fluid chamber 10 is defined by the wall 11 of the respective combustion chamber 4, an outer wall 11a parallel to the cylinder head floor 13, and a circumferential wall 11b, which surrounds the sparking plug dome 12 containing the sparking plug bore 7, and only has the inlet and outlet ducts 5 or 6 and the wall of the valve guide 9 passing through. Between the cylinder head floor 13 and the walls 14 or 15 of the inlet and outlet ducts 5 or 6 are formed openings 16 which communicate via cooling fluid inlet orifices 17 in the cylinder head floor 13, with cooling water chambers 18 arranged in the cylinder block 3, and through which the cooling fluid can pass into the cooling fluid chamber 10. Moreover, between the two inlet ducts 5 and the two outlet ducts 6 a through-flow orifice 19 or 20 is provided in each case, through which the cooling fluid can flow from the openings 16 upwards into the upper part of the cooling fluid chamber 10. The cooling fluid chamber 10 also extends in partial segments 21 round the outlet ducts 6. Ribs 22 and 23, which project from the circumferential wall 11b, cause the cooling fluid to be directed against the wall 11 of the combustion chamber 4 and against the wall of the sparking plug dome 12. The fluid thus effectively cools these parts which are subject to particularly high thermal stress. As is evident from FIG. 3, a drainage duct 24 emanates from a point close to the highest point of the cooling water chamber 10, and opens into a drainage collector duct 25, which as is seen in FIG. 6, extends along the cylinder head 1 and is sealed by a cover 26 which is a part of the suction manifold pipe 27. The cooling fluid is drained from the drainage collector duct 25 in the normal way. The drainage orifice 24a lies closer to the dome 12 than the inflow orifices 17, so that the cooling fluid is caused to flow upwards along the dome 12.

As will be evident from FIGS. 4 and 5, the cooling fluid chamber 10 for each combustion chamber is sealed in itself, and is therefore not in communication with the cooling fluid chambers of adjacent combustion chambers, and it is manufactured by means of a single unipart casting core.

The second embodiment, shown in FIGS. 7-10, in which identical or similar parts are indicated with the same reference numbers as in FIGS. 1-6, but with a suffix, differs from the first embodiment essentially in the fact that the inflow orifices 17' in the cylinder head floor 13' are arranged only on the side of the outlet ducts 6', and the cooling water annular chamber 10' surrounding the spark plug dome 12' communicates with a drainage collector pipe 25' on the side of the inlet ducts 5'. As in the first embodiment, there are formed between the cylinder head floor 13' and the walls 14' or 15' of the inlet and outlet ducts 5' or 6', openings 16 which constitute a part of the annular chamber 10' and communicate with the upper part of the annular chamber 10' by means of through-flow orifices 19' or 20' between adjacent inlet ducts 5' or between adjacent outlet ducts 6'.

The cooling fluid passes through the inflow orifices 17' on the side of the outlet ducts 6' into the part 16' of the annular chamber 10', flows round the combustion chamber wall 4' and the spark plug dome 12', rises upwardly through the through-flow orifices 20' and flows downwards through the through-flow orifice 19' and is led away through the drainage collector pipe 25' on the side of the inlet ducts 5'. The ribs 22' and 23' once again contribute to the cooling fluid current being directed against the spark plug dome 12'.

As in the first embodiment, the annular fluid chambers 10' for each combustion chamber are separate from each other, and they can each be formed by means of a single unipart casting core. Consequently, there are the same advantages in regard to the manufacture of the cylinder head as in the first embodiment.

We claim:

1. A fluid-cooled cylinder head for a multi-cylinder internal combustion engine, the cylinder head having a combustion chamber for each cylinder, valve-controlled inlet and outlet ducts opening into each chamber, a bore for a spark plug or injection valve also opening into the chamber and located in a dome or ridge, cooling fluid chambers defined by the walls of the combustion chambers and through which the inlet and outlet ducts and also the dome extend, inlet orifices in the floor of the cylinder head, communicating with said cooling chamber and also with cooling chambers in the cylinder block, and outflow ducts leading therefrom, the cooling fluid chambers for the individual combustion chambers being separated from each other, and each cooling fluid chamber being in the form of a single annular chamber which surrounds the respective dome, and through which the inlet and outlet gas ducts and the valve guides for the outlet valve or valves pass, the circumferential wall of the annular chamber having ribs which extend in the direction of the dome, and the drainage duct of each annular chamber opening into a drainage collector duct which extends along the cylinder head.

2. A cylinder head as claimed in claim 1, in which the drainage duct emanates from a point of the annular chamber which lies at or adjacent the highest point of the annular chamber, and/or lies closer to the dome than the inlet orifices.

3. A cylinder head as claimed in claim 2, in which the inlet orifices to the annular chamber are provided both on the side inlet duct and also on the side outlet duct.

4. A cylinder head as claimed in claim 2, having several inlet and several outlet ducts, and in which orifices for cooling fluid are provided between adjacent inlet ducts and between adjacent outlet ducts.

5. A cylinder head as claimed in claim 1, having at least two inlet ducts and at least two outlet ducts, and in which the inflow orifices to the annular chamber are arranged on side outlet ducts, and orifices for cooling fluid are provided between adjacent inlet ducts and between adjacent outlet ducts adjacent to the annular chamber, and the annular chamber communicates with the drainage duct at a point which lies on the side of the inlet ducts.

6. A cylinder head as claimed in claim 1, in which the drainage collector duct opens outwardly and is sealed by a screwed-on closure.

7. A cylinder head as claimed in claim 6, in which the cover is a part of the inlet pipe.

* * * * *